United States Patent [19]
Andres

[11] Patent Number: 5,692,171
[45] Date of Patent: Nov. 25, 1997

[54] METHOD OF EXTRACTING STATISTICAL PROFILES, AND USE OF THE STATISTICS CREATED BY THE METHOD

[75] Inventor: Frédéric Andres, Paris, France

[73] Assignee: Bull S.A., Paris, France

[21] Appl. No.: 622,932

[22] Filed: Mar. 27, 1996

Related U.S. Application Data

[63] Continuation of Ser. No. 256,361, filed as PCT/FR93/01141, Nov. 19, 1993, published as WO94/12942, Jun. 9, 1994, abandoned.

[30] Foreign Application Priority Data

Nov. 20, 1992 [FR] France .................. 92 13988

[51] Int. Cl.$^6$ .................................... G06F 17/30
[52] U.S. Cl. .................................... 395/601
[58] Field of Search ........................ 395/601, 602

[56] References Cited

U.S. PATENT DOCUMENTS

| | | | |
|---|---|---|---|
| 4,153,931 | 5/1979 | Green et al. | 395/600 |
| 4,751,635 | 6/1988 | Kret | 395/600 |
| 5,091,852 | 2/1992 | Tsuchida et al. | 395/600 |
| 5,179,701 | 1/1993 | Chisholm | 395/600 |
| 5,265,244 | 11/1993 | Ghosh et al. | 395/600 |
| 5,325,505 | 6/1994 | Hoffecker et al. | 395/425 |
| 5,574,904 | 11/1996 | Yunoki et al. | 395/601 |

OTHER PUBLICATIONS

Mannino et al "Statistical Profile Estimation in Database Systems" ACM Comp. Surv. vol. 20, No. 3 pp. 191–221, 1988.

Falcitelli, G. et al., "Intelligent Databases for Medical Statistical Analiysis", IEEE Eng. in Medicine and Biology Society 11th Annual Int. Conf. pp. 1851–1852, Jun. 1989.

Srivastava, J. et al. "TBSAM: An Access Method for Efficient Processing of Statistical Queries", IEEE Trans. on Knowledge+Data Eng., vol. 1, No. 4, pp. 414–423, Dec. 1989.

Ghosh, S.P., "Statistical Relational Database: Normal Forms", IEEE Trans. on Knowledge and Data Engineering vol. 3, No. 1, pp. 55–64, Mar. 1991.

Hsieh, C.H. et al. "Reorganization of Historical Data to Support the Analysis of Organzations Behaviour" IEEE Trans. on Systems Man ahd Cybernetics, vol. 19, No. 1, Feb. 1989.

*Primary Examiner*—Thomas G. Black
*Assistant Examiner*—Jack M. Choules
*Attorney, Agent, or Firm*—Kerkam, Stowell, Kondracki & Clarke, P.C.; Edward J. Kondracki

[57] ABSTRACT

The present invention relates to a method of extracting statistical profiles from a relational data base organized by relation, attribute, and index. The profiles are arranged in tables (210, 220) that are included in the data base (21, 22). A target object is selected from among the possible choices. The choices are one column of a table, all the columns of a table, all the tables, or a particular selection; and a statistical profile is produced or generated.

11 Claims, 6 Drawing Sheets

ACE -- Attribute Profile attribute name [601]

orginality [602]

604 type [INTEGER ☐]

domain cardinality [603]

logical statistics: ──── 605

Population ◇ ALL THE TUPLES ◇ SAMPLING ⤻ 606

607 ⟶ statistical method [UNIFORM ☐]

608 ⟶ distribution mode [UNIFORM ☐]

minimal value [610]

maximum value [609]

data placement statistics: ──── 61

Population ◇ ALL THE TUPLES ◇ SAMPLING ⤻ 611

612 ⟶ statistical method [UNIFORM ☐]

613 ⟶ distribution mode [UNIFORM ☐]

[OK] [Cancel] [Help]

FIG. 6

METHOD OF EXTRACTING STATISTICAL PROFILES, AND USE OF THE STATISTICS CREATED BY THE METHOD

This is a continuation of application Ser. No. 08/256,361, filed as PCT/FR93/01141, Nov. 19, 1993, published as WO94/12942, Jun. 9, 1994, now abandoned.

1. Field of the Invention

The present relates to a method of extracting statistical profiles from a relational data base, and to the use of the statistics created by the method.

2. Background of the Prior Art

Relational data bases are famous for their value compared with hierarchical data bases. However, for certain applications and depending on how the data base was designed, the response time or any other performance may be deemed insufficient. This means that either the information processing system must be adapted to obtain sufficient response times, or the structure of the data base or even the requests formulated must be modified. To enable determining the mutual influence of structural modifications of the information processing system or of the data base, or of how the requests are formulated, reference may be made to an earlier French application 91.03915, published under No. 2 674 651, which described an improved device for performance evaluation that makes use of a set of libraries, architectures, systems, access methods, and finally data base profiles. These libraries are necessary to perform this evaluation of the data base performance, or in other words to evaluate the time for response to a request.

SUMMARY OF THE INVENTION

More specifically, the present invention relates to a method of extracting statistical profiles that make up the library of data base profiles used in this performance evaluation device.

A first object of the invention is accordingly to propose a method extracting statistical profiles from a data base that consumes neither excessive time nor excessive memory space to memorize the result.

This object is attained in that the method of extracting statistical profiles from a relational data base organized by relation attribute index, said profiles being arranged in tables that are included in the data base, and characterized in that it includes:

a step of selecting a target object from among the possible choices as an object, which are one column of a table, all the columns of a table, all the tables, or a particular selection, one column of one table representing one attribute and;

a step of production of statistical profiles.

Another object is to furnish a method of profile extraction that is adaptable to any sort of data regardless of the data type.

This object is attained in that the method includes, in the step of profile generation, either a step of generating value distribution statistics (logic statistics); or a step of generating value placement statistics (physical statistics).

In another feature, the step of generating value distribution statistics includes:

a step of verification of correlations to find the mathematical dependencies;

a step of verification of distributions to determine whether the data distribution is uniform or nonuniform and;

a step of production of statistics.

In another feature, if the data distribution is nonuniform, the distribution verification step includes a step of verification of the data type to determine whether the data are of the alphabetic, alphanumeric or numeric type and producing the statistics in a form corresponding to the types.

In another feature, the statistical structure corresponding to the nonuniform alphabetic type is a constant height histogram, as well as a table containing the profiles of the relation and the attribute in the form of minimal and maximum values.

In another feature, the form corresponding to the numeric type is, depending on the type of value, either a constant height histogram, or a moment. A table contains the profiles of the relation of the attribute in the form of minimal and maximum values.

In another feature, the form corresponding to the uniform alphabetic type is a table containing the relation and attribute profiles including the minimal and maximum values.

In another feature, the step of generating value placement statistics produces the statistics in a constant height histogram form.

In another feature, the profiles are arranged respectively in the following:

a relation profile table containing the statistics on the relations;

an attribute profile table containing the attribute statistics;

an index profile table containing the statistics on the indexes; three tables containing the statistics on the attributes whose values follow uniform distributions;

two tables containing the statistics on the attributes whose values follow non-uniform distributions;

three tables containing the statistics in the form of constant height histograms on the attributes whose values follow nonuniform distributions;

a table containing the statistics in the form of a constant width histogram about the attributes for a traditional display of the statistics and;

seven tables, which contain the statistics for the correlated attributes.

Another object of the invention is to propose a use of the statistics created by the method above. This object is attained in that the use of extraction of statistical profiles, from a relational data base in which the relations have attributes, consists of:

accessing the statistical profile of the attribute of a selected relation;

if the statistic profile exists, comparing the confidence rate of the profile with the confidence rate desired by the user in evaluating the cost of a request made of the data base;

in the cases where the statistic profile does not exists, or in the case where the confidence rate is less than the desired confidence rate, the method of extraction is applied to the attribute of the relation selected, to generate the statistical profile and;

storing the statistical profile that meets the confidence rate in the library of profiles of the data base with a view to its use by an adaptable performance evaluation device.

BRIEF DESCRIPTION OF THE DRAWINGS

Further features and advantages of the present invention will become more clearly apparent from reading the ensuing description, taken in conjunction with the accompanying drawings, in which:

FIG. 6 shows a window concerning the attributes of the relation for which the profile is evaluated.

DESCRIPTION OF THE PREFERRED EMBODIMENTS

Figure 1:
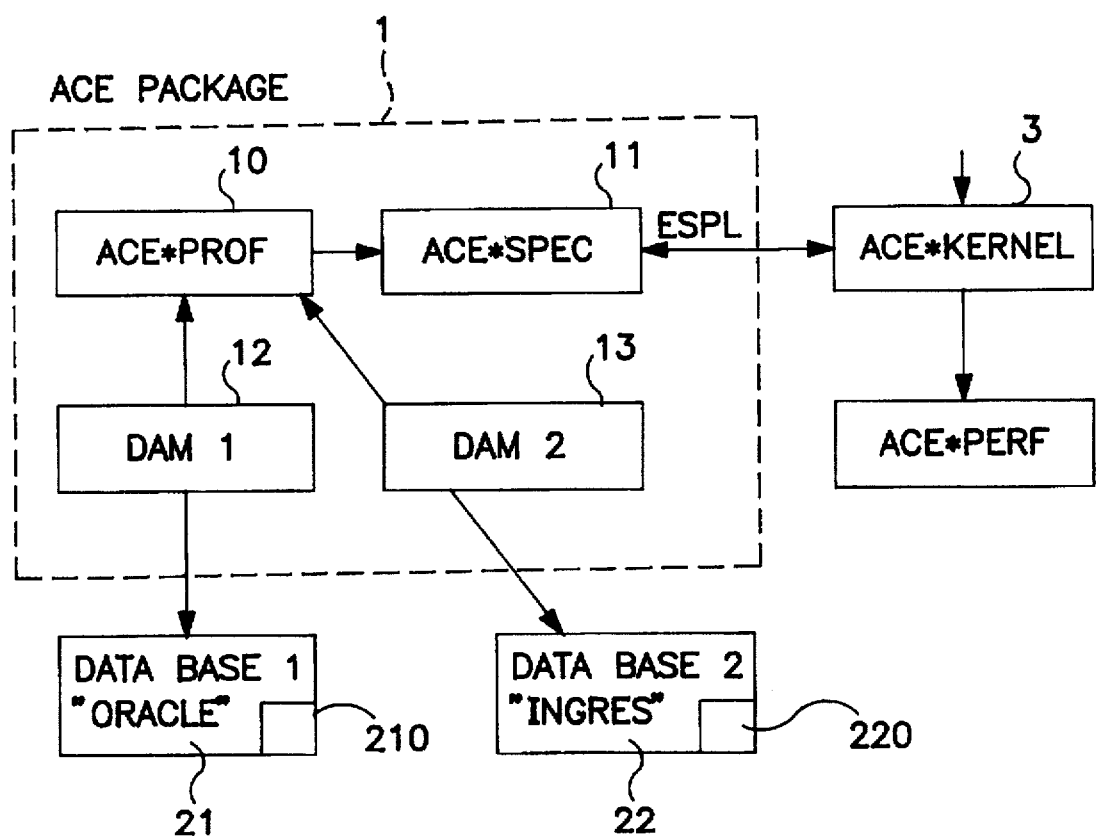
FIG. 1 is a schematic block diagram view of a statistical profile extraction device disposed between a data base and a performance evaluator.

FIG. 1 shows an information processing system that uses a cost evaluator (3) that receives information from a set (1) intended for extracting statistical profiles from data bases (21, 22). One relational-type data base (21) may be of the "ORACLE" type, for example, while another data base (22) may be of the "INGRES" type. Each data base communicates with the profile extraction module (10) through interfaces (12 and 13), which are data acquisition manager adapted to the data base. In this way, the profile extraction module (10) has interfaces (12 and 13) capable of working with the current data bases, and it is universal and flexible to use. The cost and performance evaluation device (3) is of the type described in International Patent Application PCT/92/090587, or in French Patent Application 91.03915 that was published on Oct. 2, 1992 under No. 2 674 651. This type of device makes use of a set of libraries, one of which is made up of a library of statistical profiles. The subject of the invention relates principally to the device that makes it possible to develop the statistical profile library, and to the method used by this device. The device (10) is made up of a program executed by an information processing system to enable the development of statistical profiles, while the device (11) is made up of a program executed by an information processing system to enable the showing of information concerning the profile of the relation and the profile of the attributes of the relation on the screen of the system.

The program (10), after having developed the statistical profiles, creates respective tables (210, 220), in which it arranges the statistics. The tables are created in the data base (21 and 22, respectively) with which it is working. These tables (210 and 220) are made up of a relation profile table (REL-PROF), which contains the statistics on the relations; an attribute profile table (ATT-PROF), which contains the statistics on the attributes; an index profile table (IND-PROF), which contains the statistics on the indexes; three tables, uniform-integral (UNIF-INT), uniform-decimal (UNIF-FLO), uniform-string (UNIF-STR), these three tables containing the statistics on the attributes whose values follow uniform distributions. There are two tables, moment-integral (MOM-INT) and moment-decimals (MOM-FLO), which contain the statistics in the attributes whose values follow a nonuniform distribution; three tables histo-integral (HIST-INT), histo-decimal (HIST-FLO), histo-string (EIST-STR), which contain the statistics in constant height histogram form on the attributes whose values follow nonuniform distributions; a length-histo table (LENG-HIST), which contains the statistics of the attributes in the form of a constant-width histogram (for display to the users); and finally, seven tables, multidimensional histogram (MULT-HIST), integral table (INT-TAB), table of decimals (FLO-TAB), string table (STR-TAB), date table (DAT-TAB), histogram of relations (REL-MHIST), histogram of the attributes (ATT-MHIST), which contain statistics on the multiple attributes.

The software (10) also develops statistics that enable either calculating the logical selectivity or the physical selectivity of the data. In the case of logical selectivity, these statistics make use of the value distribution statistics (VDS), which are developed in the flow chart (20) of FIG. 2, and in the case of physical selectivity they make use of the data placement statistics (DPS). These data placement statistics make it possible to develop the physical selectivity and correspond to the flow chart (30) in FIG. 3. For the data placement statistics, the profile extraction program extracts constant height histograms from the data, as can be seen in FIG. 3. In the case of statistics that make it possible to evaluate the logical selectivity, the statistical profile extraction program follows the flow chart of FIG. 2. In that case, the program first, in step (23), performs a verification of correlation to see whether or not there is any correlation among attributes.

This verification of correlation is done by a correlation measurement based on the entropy (marked H) in the distributions.

For example, let there be two attributes X and Y, whose value domains are Dx and Dy, respectively. The question to be answered is: is there any correlation between the values Dx and the values Dy?

Figure 2A:
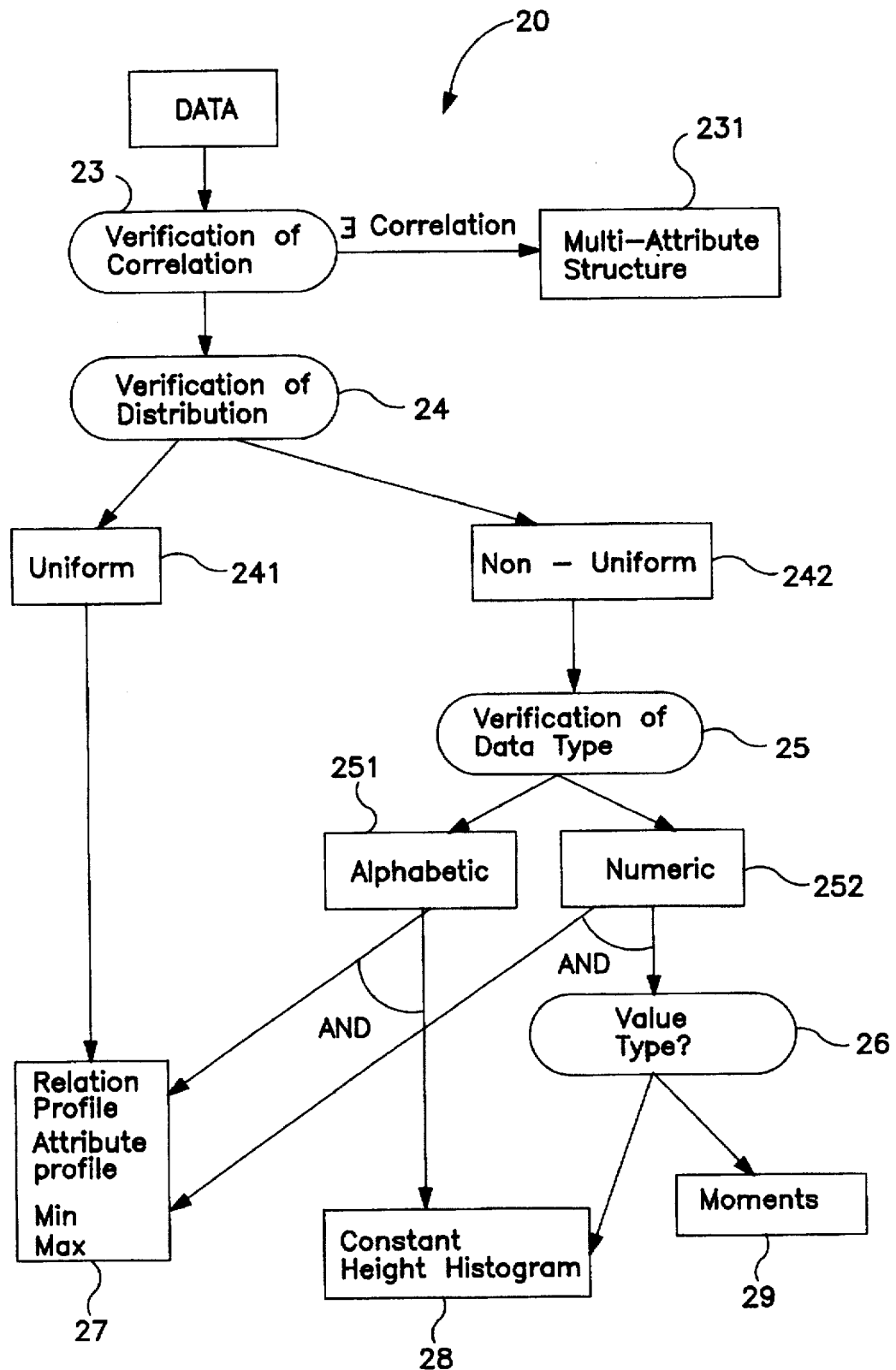
FIG. 2a is a flow chart of the program of the statistical profile extraction device as shown in FIG. 1 for evaluation of the statistical distribution.
Figure 2B:
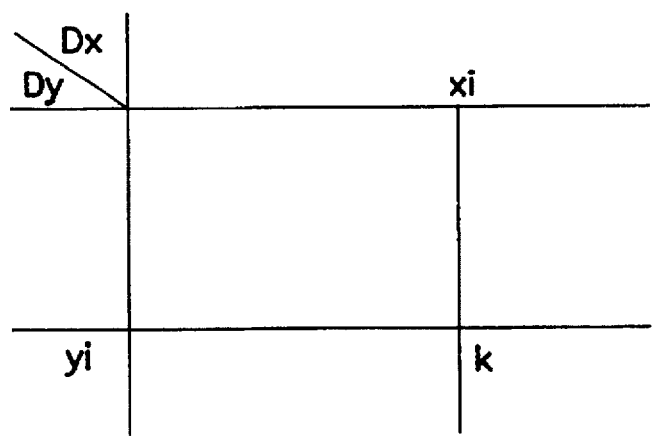
FIG. 2 comprising

Dx and Dy with respect to the data of the application may be classified as shown in FIG. 2b, where K is the number of tuples such that the attribute X assumes the value xj and the attribute Y assumes the value yj.

$$H(x) = -\sum_j pi \ln pi \text{ où } pi = \frac{Ni}{N}$$

Ni is the number of tuples for the $i^{th}$ value of the domain Dx; N is the total number of tuples.

ln = natural logarithm $$H(Y) = -\sum_j pj \ln pj$$

$$H(Y/X) = -\sum_{ij} pij \ln \frac{pij}{pi}$$

The coefficient U of dependency between X and Y becomes:

$$U(Y/X) = \frac{H(Y) - H(Y/X)}{H(Y)}$$

The system evaluates H(X), H(Y), H(Y/X) and then U(Y/X) to determine the correlation, in the following manner:

If U(Y/X)=0, then X and Y have no dependency whatever.

If U(Y/X)=1, then X and Y are completely dependent.

Figure 3:
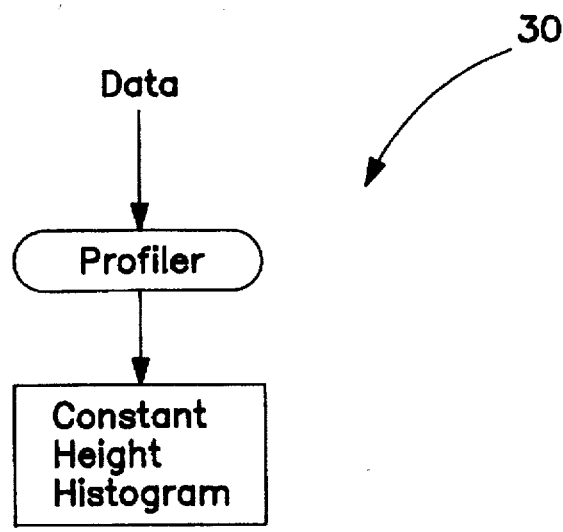
FIG. 3 is a flow chart of the program of statistical profile extraction with respect to placement of the data.

If correlation exists, then a data structure with a plurality of attributes is involved, and in that case, as shown in FIG. 2, the program in step (231) represents these correlations in the form of multidimensional constant height histogram structures. In the case where there is no correlation, the programs moves to the next step (24), which is a step of verifying the distribution to verify whether the distribution is uniform or nonuniform.

Monitoring the distribution is based on the $X^2$ test.

In the following text, the designation $X$ is used to represent the cursive "X" of the formula.

Let Ni be the number of tuples observed for a given value of an attribute and ni the number of tuples expected in the distribution studied (binomial distribution, exponential distribution, normal distribution).

$$\chi^2 = \sum_i \left( \frac{Ni - ni}{ni} \right)^2$$

If $X^2$ is large, this means that the attribute values do not follow the distribution sought. If $X^2=0$, this means that the attribute values precisely follow the distribution contemplated.

In the case of uniform distribution (241), the program moves to a step (27) of representing the relation profile, the attribute profile, and the minimums and maximums. In the case where the distribution is nonuniform (242), the program moves to a step (25) of verification of the data type and in step (251) verifies whether the data are alphabetic, to develop a relation profile or an attribute profile containing the minimal and maximum values, as shown in step (27), and then develop a constant height histogram as shown in step (28). In the case where the program determines that the type of data is numerical in step (252), it develops a relation or attribute profile by way of these minimal and maximum values, as shown in step (27), and then makes a search for the type of value, as shown for step (26). In that case, the program develops the profile either in the form of a constant height histogram represented by step (28) or in the form of a moment of order (i) shown in step (29).

A moment of order (i) is equal to the sum of values of a specific attribute (Y), raised to the power (i): $Mi=\Sigma Y^i$.

Thus by applying this statistical extract method as described above to the data of the data base, the device (10) extracts the tables making up the profile library of the data base. This profile library makes it possible to determine a confidence rate of the statistics extracted from the data base. The rate of error propagated by the statistical profile must be less than the desired confidence rates for the evaluations. Thus the evaluation program (3) will use the statistics stored in the library (210, 220), if the error rate of these statistics is less that the desired confidence rate and if the statistics do not require updating. If not, then the profile extraction program will be executed to update the statistics, either because the error rate is below the desired confidence rate or because the data base has been updated and consequently the statistics are not reliable.

In fact, the confidence rate is 100% for a profile that has just been created or updated. Any modifications in the real data base reduce this confidence rate. This is due to the consequences of the modifications (insertion, updating, cancellation) in the statistics of each attribute, and in particular in the distribution.

The value of the extractions done by this profile extractor module (10) is of having a sufficiently representative profile that can be used in the performance evaluator without entailing any overly major calculation time. This makes it possible, from statistical profiles, either to evaluate the cost of a request as a function of a given architecture or to search for the optimal architecture so that the cost of the given type of request will be minimal, and so forth. In its use of the profile, the evaluation program executes the following steps: access to the statistical profile concerning the attribute of a given relation;

if the statistical profile exists, comparison of the confidence rate with the confidence rate required;

if the statistical profiles do not exist, or if the confidence rate is lower than the required confidence rate, startup of the program of extracting profiles on the attribute of the given relation;

startup of the performance evaluation program once the statistical profile generation is completed.

The statistical profile evaluation program (10) is associated with a representation module (11) which makes it possible to show the main information on the relation profile and the attribute profile on the screen of the machine on which the evaluations and profiles have been extracted.

Figure 4:
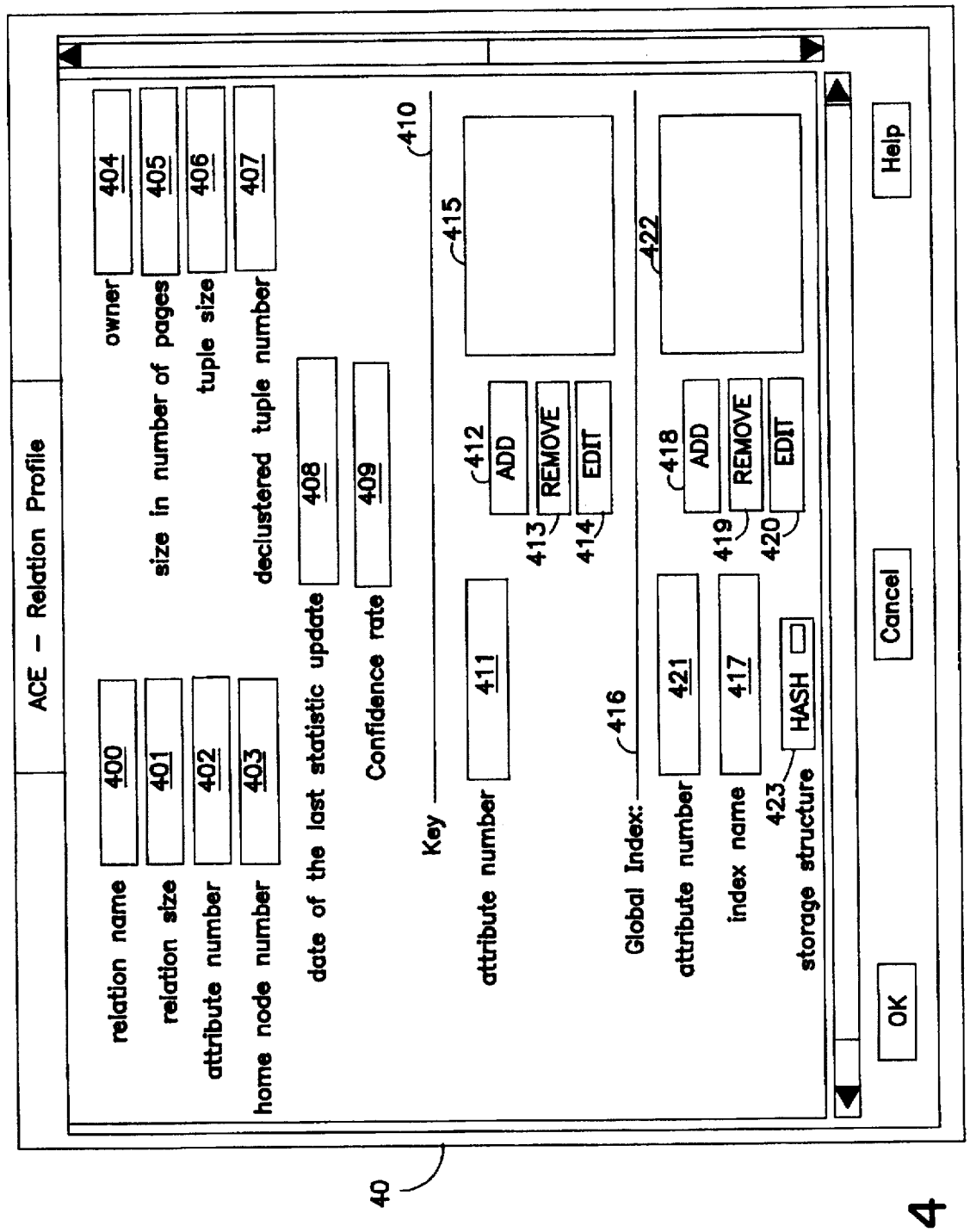
FIGS. 4 and 5 show a window on the screen of the information processing system for showing information concerning the relation for which the profile is made.
Figure 5:
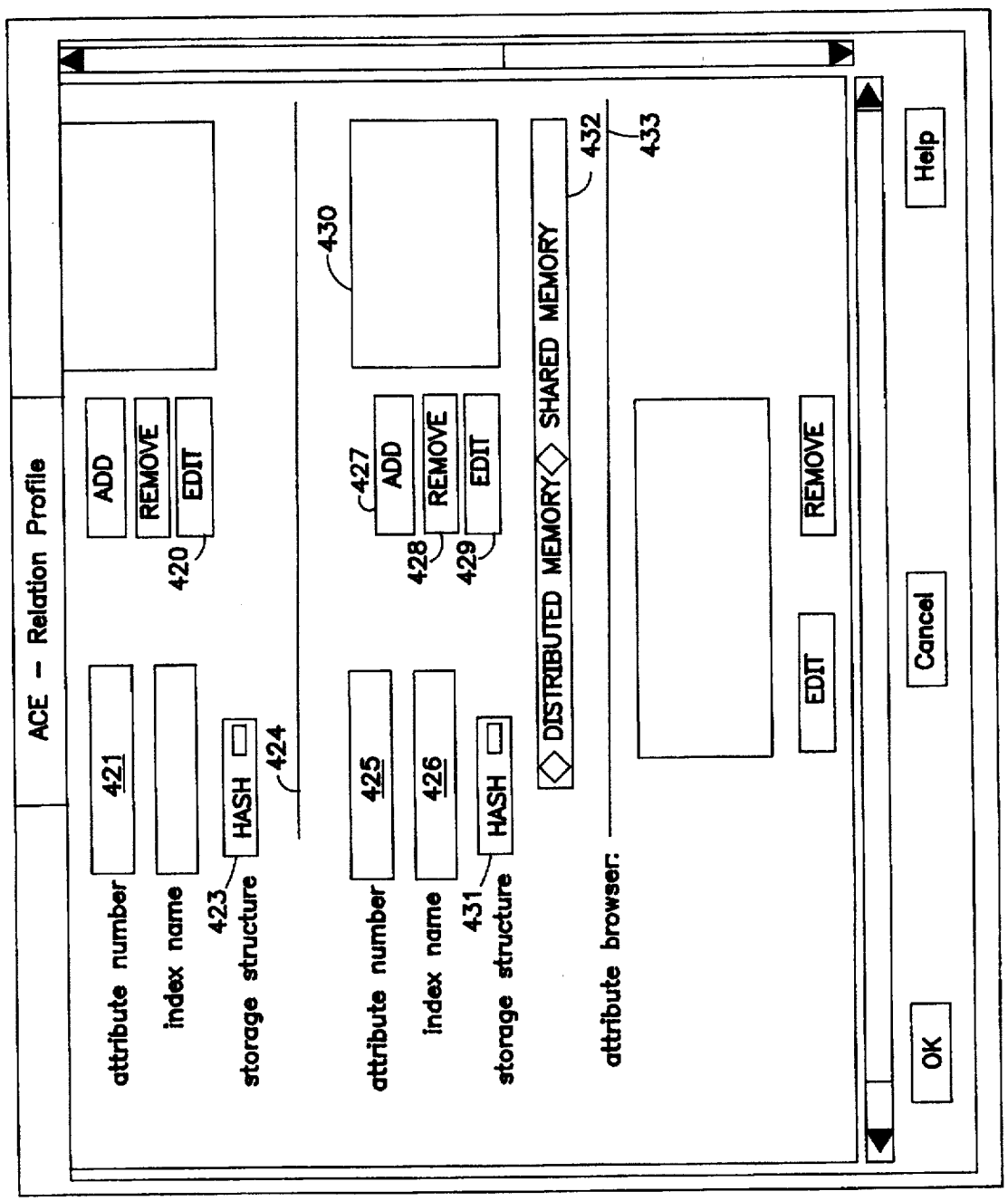

FIG. 4 shows the profile of a relation developed by the software. This profile is displayed by the module (11) in the form of a window (40) including a display box (400) making it possible to display the name of the relation; a display box (401) for displaying the size of the relation; a display box (402) enabling display of the attribute number; a display box (403) for displaying the home node number of origin; a display box (404) enabling display of the name of the owner; a box (405) for displaying the size and number of pages; a box (406) enabling display of the size of the tuples; a box (407) for displaying the declustered tuple number; a box (408) enabling display of the date of the last update of the statistic developed by the program (10); and a box (409) enabling display of the confidence rate of this statistic. One display line (410) makes it possible to enter the rank of the attribute that is key for a relation; a display box (411) enables displaying the attribute number, and three command buttons (412, 413, 414) make it possible to perform the add, remove or erase, and edit functions, respectively, on the display in the box (415). A display line (416) of the global index enables direct access to a datum; a display box (421) of an attribute number; a display box (417) of the name of an index, and three functions, add, remove, edit, which are relatively accessible by three command buttons (418, 419, 420). These functions make it possible to act upon the display in a box (422) and also make up the display of the relation profile window (40).

A command button (423) enables associating a storage structure with the global index defined above; two structures are possible, either an address calculation structure (or hash) or a b-tree structure.

The display boxes (423, 431) are scrolling menu boxes that enable a selection to be made between an address calculation algorithm storage structure and a tree structure.

A line (424) enables entering a local index; a box (425) enables defining the attribute number; another box (426) enables defining an index name; three functions, add (427), remote (428) and edit (429) enable modifying the display of a box (430); and a command button (431) makes it possible to associate a storage structure with this index, two structures being available, either an address calculation algorithm or a tree structure. Finally, a box (432) enables defining the type of target environment for the evaluation, that is, whether the memory is distributed or shared, and a line (433) enables making an attribute sweep and displaying its respective profile.

FIG. 6 makes it possible to define or display the attribute profiles by displaying the following boxes in a window (60): a box (601) enabling defining the attribute name, a box (602) enabling defining its originality, a box (603) enabling defining the number of values taken by the domain, and a display button (604) enabling indicating the type of attribute, that is, whether it is an integer. A display line (605) enables defining the logical statistics, and a display box (606) enables indicating the population for which the profile is made. This box (606) displays whether the profile is made for all the tuples or for a sampling, the latter so as to reduce the cost of access to the data. A box (607) enables selecting the type of statistical method, for example a Uniform method; a box (608) enables defining the mode of attribute distribution, for example a uniform mode; a box (610) displays the minimal value of the attribute; and a box (609) displays the maximum value. A line (614) enables indicating the statistics on data placement, and a box (611) enables indicating whether these statistics were made for all the tuples or simply for a sampling. A box (612) indicates the statistical method used, for example uniform, and a box (613) indicates the uniform distribution model for example.

The scrolling menu boxes (607, 612) enable selecting a method of processing statistics, the selection being between the uniform method, the histogram method, the method based on multidimensional histograms, and the method based on the moments.

The scrolling menu boxes (608, 613) enable selecting or displaying a data distribution mode, from among the uniform or nonuniform or poisson distribution, or normal distribution modes.

Further modifications within the competence of one skilled in the art are also within the spirit and scope of the invention.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

I claim:

1. A method of extracting statistical profiles from a relational data base organized by relation, attribute, and index, said method comprising the steps of:

selecting a target object from among possible choices, said possible choices being one column of a table, all the columns of a table, all the tables, or a predefined selection; and generating statistical profiles of the target object and storing the statistical profiles in tables that are included in the database; wherein the step of generating statistical profiles includes:

generating value distribution statistics and value placement statistics, wherein the step of generating value placement statistics includes producing the statistics in the form of constant height histograms;

and further wherein the step of generating value distribution statistics includes:

verifying correlations to find mathematical dependencies;

verifying data distributions to determine whether a data distribution is uniform or nonuniform; and producing statistics.

2. The method of claim 1, wherein, if the data distribution is nonuniform, the distribution verification step includes:

verifying data types to determine whether the data types are of alphabetic, alphanumeric or numeric type to produce the statistics in a form corresponding to the data type, respectively.

3. The method of claim 2, wherein the statistical structure corresponding to the nonuniform alphabetic type is:

a constant height histogram (28); and a table (27) containing the profiles of the relation and the attribute in the form of minimum and maximum values.

4. The method of claim 3, wherein the profiles are arranged respectively as follows:

a relation profile table (REL-PROF) containing statistics on relations;

an attribute profile table (ATT-PROF) containing attribute statistics;

an index profile table (IND-PROF) containing statistics on the indexes;

three tables (uniform-int, uniform-float, uniform-string) containing statistics on attributes whose values follow uniform distributions;

two tables (moment-int, moment-float) containing statistics on attributes whose values follow non-uniform distributions;

three tables (histo-int, histo-float, histo-string) containing statistics in the form of constant height histograms on attributes whose values follow non-uniform distributions;

a table (length-histo) containing statistics in the form of constant width histograms on attributes to facilitate the display of the statistics; and seven tables (multi-hist, int-table, float-table, string-table, date-table, rel-mhist, att-mhist), which contain statistics for correlated attributes.

5. The method of claim 2, wherein the form corresponding to the numeric type (252) is, depending on a value thereof:

either a constant height histogram (28);

or a moment (29);

and further including a table (27) containing profiles of the relation of the attribute in the form of minimum and maximum values.

6. The method of claim 5, wherein the profiles are arranged respectively as follows:

a relation profile table (REL-PROF) containing statistics on relations;

an attribute profile table (ATT-PROF) containing attribute statistics;

an index profile table (IND-PROF) containing statistics on the indexes;

three tables (uniform-int, uniform-float, uniform-string) containing statistics on attributes whose values follow uniform distributions;

two tables (moment-int, moment-float) containing statistics on attributes whose values follow non-uniform distributions;

three tables (histo-int, histo-float, histo-string) containing statistics in the form of constant height histograms on attributes whose values follow non-uniform distributions;

a table (length-histo) containing statistics in the form of constant width histograms on attributes to facilitate the display of the statistics; and seven tables (multi-hist, int-table, float-table, string-table, date-table, rel-mhist, att-mhist), which contain statistics for correlated attributes.

7. The method of claim 2, wherein the profiles are arranged respectively as follows:

a relation profile table (REL-PROF) containing statistics on relations;

an attribute profile table (ATT-PROF) containing attribute statistics;

an index profile table (IND-PROF) containing statistics on the indexes;

three tables (uniform-int, uniform-float, uniform-string) containing statistics on attributes whose values follow uniform distributions;

two tables (moment-int, moment-float) containing statistics on attributes whose values follow non-uniform distributions;

three tables (histo-int, histo-float, histo-string) containing statistics in the form of constant height histograms on attributes whose values follow non-uniform distributions;

a table (length-histo) containing statistics in the form of constant width histograms on attributes to facilitate the display of the statistics; and seven tables (multi-hist, int-table, float-table, string-table, date-table, rel-mhist, att-mhist), which contain statistics for correlated attributes.

8. The method of claim 1, wherein the form corresponding to the uniform alphabetic type (251) is a table containing the relation and attribute profiles including the minimum and maximum values.

9. The method of claim 8, wherein the profiles are arranged respectively as follows:

a relation profile table (REL-PROF) containing statistics on relations;

an attribute profile table (ATT-PROF) containing attribute statistics;

an index profile table (IND-PROF) containing statistics on the indexes;

three tables (uniform-int, uniform-float, uniform string) containing statistics on attributes whose values follow uniform distributions;

two tables (moment-int, moment-float) containing statistics on attributes whose values follow non-uniform distributions;

three tables (histo-int, histo-float, histo-string) containing statistics in the form of constant height histograms on attributes whose values follow non-uniform distributions;

a table (length-histo) containing statistics int he form of constant width histograms on attributes to facilitate the display of the statistics; and seven tables (multi-hist, int-table, float-table, string-table, date-table, rel-mhist, att-mhist), which contain statistics for correlated attributes.

10. The method of claim 1, wherein the profiles are arranged respectively as follows:

a relation profile table (REL-PROF) containing statistics on relations;

an attribute profile table (ATT-PROF) containing attribute statistics;

an index profile table (IND-PROF) containing statistics on the indexes;

three tables (uniform-int, uniform-float, uniform-string) containing statistics on attributes whose values follow uniform distributions;

two tables (moment-int, moment-float) containing statistics on attributes whose values follow non-uniform distributions;

three tables (histo-int, histo-float, histo-string) containing statistics in the form of constant height histograms on attributes whose values follow non-uniform distributions;

a table (length-histo) containing statistics in the form of constant width histograms on attributes to facilitate the display of statistics; and seven tables (multi-hist, int-table, floattable, string-table, date-table, rel-mhist, att-mhist), which contain statistics for correlated attributes.

11. A method of using statistics created by a method of extraction of statistical profiles from a relational data base, wherein relations in said relational data base are arranged by attributes, said method comprising the steps of:

accessing the statistical profile of an attribute of a selected relation;

if the statistic profile exists, comparing a confidence rate of the profile with a confidence rate desired by a user in evaluating a cost of a request made of the data base by a performance evaluation device;

if the statistic profile does not exist, or if the confidence rate of the statistical profile is less than said confidence rate desired by the user, applying said method of extraction of the statistical profile to the attribute of the relation selected, to generate the statistical profile; and storing said statistical profile in a library (210, 220) of profiles of the relational data base for use by an adaptable performance evaluation device.

* * * * *